Nov. 1, 1966
R. L. McBRAYER
3,282,581
METAL REDUCTION PROCESS
Filed June 18, 1962
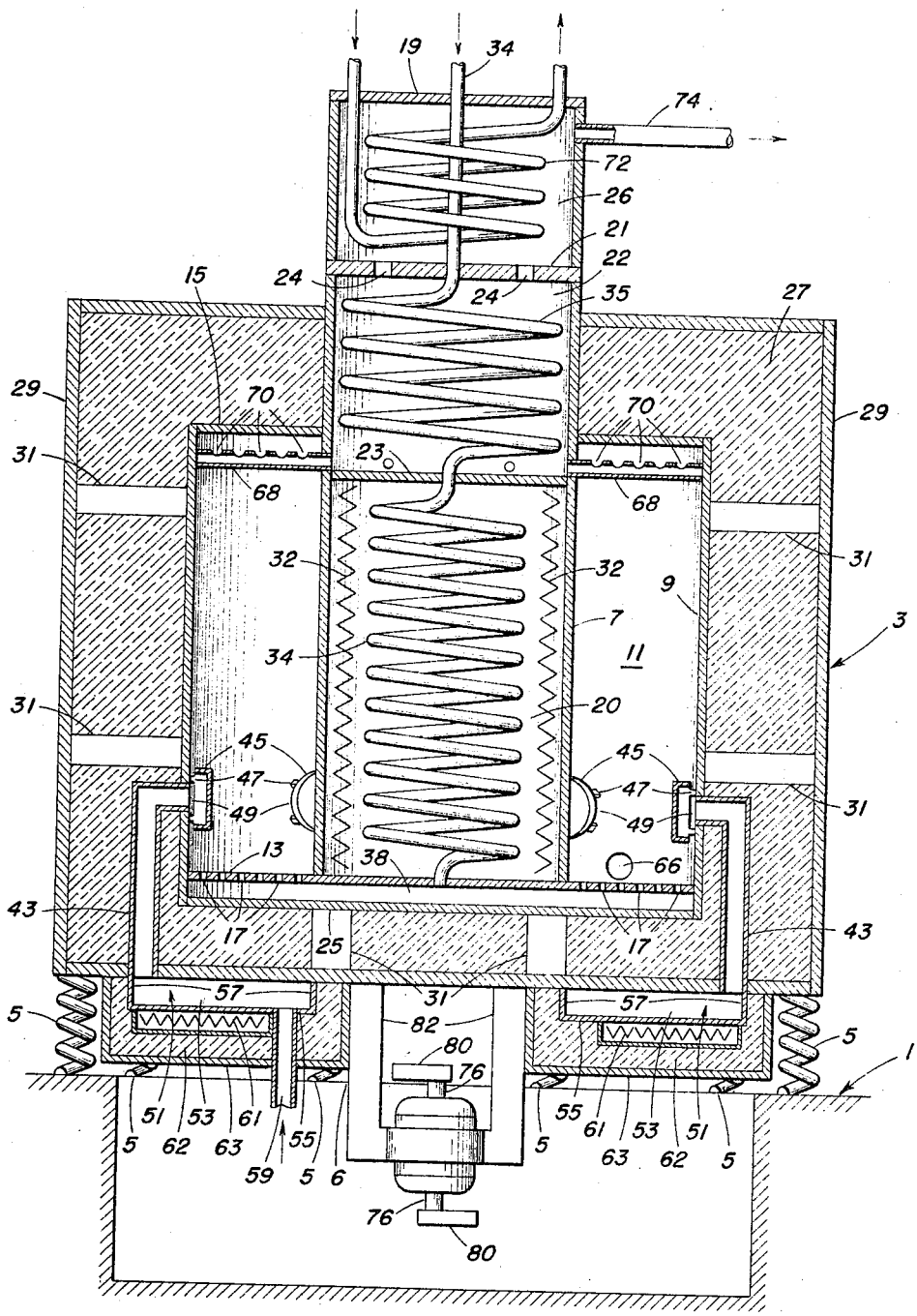
INVENTOR
Robert L. McBrayer
BY
Bernhard R. Swick
ATTORNEY United States Patent Office 3,282,581
Patented Nov. 1, 1966

3,282,581
METAL REDUCTION PROCESS
Robert L. McBrayer, Lincoln Park, Mich., assignor to Wyandotte Chemicals Corporation, Wyandotte, Mich., a corporation of Michigan
Filed June 18, 1962, Ser. No. 204,662
6 Claims. (Cl. 266—24)

This application is a continuation-in-part of patent application, Serial No. 191,226, filed April 30, 1962, and now abandoned.

This invention relates to the production of metals and, more particularly, to the production of elemental refractory metals, particularly metals of the group niobium, tantalum, molybdenum and tungsten.

The production of such metals by reducing a halide thereof with hydrogen is already known. In accordance with prior art practice, niobium pentachloride has been reduced with hydrogen to deposit an integrally bonded metallic coating on a dissimilar metal base. However, due to the presence of the dissimilar metal base, this is not adaptable for use in preparing pure elemental metals. In addition, elemental niobium is produced in the pure state by reacting a chloride of niobium such as the pentachloride with hydrogen, effecting the reaction in a closed reaction zone maintained at temperatures ranging from about 750–1050° C. by external furnacing means surrounding the reaction zone and in the reduction charging the chloride into a fluidized bed suspension of finely divided pure niobium particles maintained in ebullient motion in the reaction zone by the controlled flow of the hydrogen reducing agent being fed into the zone. The elemental niobium product formed is deposited on the suspended niobium particles, reaction by-products and unreacted hydrogen are removed from the bed and reaction zone and the large niobium metal particles formed therein as a result of the reduction and deposition are withdrawn.

This practice has certain inherent disadvantages in that it requires a large excess of the hydrogen over the amount required to completely reduce the chloride in order to have enough gas for fluidization of the bed of particles. While an inert gas may be mixed with the hydrogen to provide a rate of flow sufficient to fluidize the particles, the use of an inert gas has inherent disadvantages since it requires either large quantities of expensive inert gas or necessitates separating the inert gas from the other gases resulting from the reaction, thus requiring expensive separation operations and equipment. Further substantial heat energy, supplied by the external furnacing means, is required to maintain the reaction zone at the necessary high temperatures.

Accordingly, it is the purpose of this invention to provide a method for producing a refractory metal, particularly a metal selected from the group consisting of niobium, tantalum, molybdenum and tungsten by reducing a compound of the metal with a gaseous reducing agent wherein the amount of excess reducing agent required is substantially reduced without the addition of an inert gas to the reducing agent gas stream and wherein the amount of heat energy required to maintain the reaction zone at the reacting temperature is substantially reduced.

The accompanying drawing illustrates diagrammatically and in section a presently preferred reactor embodying the principles of this invention and a presently preferred method of operation.

With reference now more particularly to the drawing, it will be seen that the reaction apparatus comprises a suitable support or base indicated generally at 1, a reactor indicated generally at 3 and springs 5 adapted to resiliently support reactor 3 on base 1.

Reactor 3 is provided with partitioning means to define at least two chambers. More specifically, reactor 3 is provided with a central chamber and one or more outer chambers adjacent the central chamber whereby the outer chamber or chambers may be heated by heating means provided inside and along the walls of the central chamber. The central and outer chambers may take any practical shape, e.g. square, rectangular or circular, in cross section.

In accordance with a preferred embodiment of this invention, reactor 3 comprises a pair of tubular members 7 and 9 of different diameters. The tubular member 7 having the smaller diameter is concentrically disposed within tubular member 9 having the larger diameter, thereby providing a partitioning means to define a central space and an annular space surrounding the central space. Closure members such as circular metal plates 13 and 15 are provided on either end of the annular space to define an annular reaction chamber 11 surrounding tubular member 7. Plates 13 and 15 are affixed to tubular members 7 and 9 by any suitable means such as welding. Lower plate 13 is provided with perforations 17 for a purpose to be described hereinafter.

Those parts of this apparatus which come in contact with the reactants such as tubular members 7 and 9 and plates 13 and 15 may be fabricated from any suitable material of adequate strength which is nonreactive toward the reactants such as a high nickel, chromium, iron alloy such as "Inconel." "Inconel" for this purpose would generally be wrought "Inconel" which comprises 79.5% nickel, 13.0% chromium, 6.5% iron, 0.25% manganese, 0.25% silicon, 0.08% carbon and 0.20% copper. In the preferred embodiment of this invention, the smaller tubular member 7 has a greater length than the larger tubular member 9, is closed off at one end by lower metal plate 13 and extends beyond the reaction chamber at the other end as shown in the drawing. The end of tubular member 7 opposite that to which metal plate 13 is affixed is closed by a closure member such as a metal plate 19 affixed to the end of tubular member 7 by suitable means such as welding. Partitions 21 and 23 fabricated from a suitable material such as discussed above are provided inside tubular member 7. Partition 23, plate 13 and tubular member 7 define a central chamber 20 which is surrounded by the outer or reaction chamber 11. Partitions 23 and 21, plate 19 and tubular member 7 define a pair of chambers 22 and 26. The outer tubular member 9 extends a short distance beyond lower metal plate 13 and is closed by a closure member which may be a metal plate 25 affixed to the end of tubular member 9 by suitable means such as welding.

The reactor 3 includes suitable heat insulation 27 such as rock wool, etc. and an outer shell 29 which may be of heat reflective material but which, in any event, must be of sufficient strength to withstand a substantial amount of vibration and support the internal structure of reactor 3, e.g. tubular members 7 and 9, plates 13, 15, etc. and insulation 27. In order to provide such support for the internal structure of reactor 3, suitable members such as metal bars 31 are provided between shell 29 and the internal structure of reactor 3 and are firmly affixed to both the shell and the reactor by suitable means such as welding.

Suitable heating elements such as electrical resistance elements indicated diagrammatically at 32 are provided with central chamber 20 around the inside of the smaller diameter tubular member 7. A suitable means such as spiral metal tubing 34 is provided which is adapted to conduct a gaseous reducing agent such as hydrogen or a vaporized reducing metal such as magnesium, sodium, etc. through the central chamber 20 in a manner to permit heating of the gaseous reducing agent by the heating elements 32. The upper portion 35 of the spiral metal tubing 34 passes through the chamber 22 defined by inner tubular member 7 and partitions 21 and 23. This chamber 22 and portion 35 of tubing 34 serves as a heat exchanger for preheating the gaseous reducing agent by heat interchange with gaseous material from the reduction reaction. Thus, spiral metal tubing 34 provides a means for conducting the gaseous reducing agent through the heat exchanger and then through the central chamber 20. By passing the gaseous reducing agent in heat interchange relationship with the gaseous material, a substantial saving in the amount of heating required to heat the gaseous reducing agent and maintain the reactor at the desired temperature is obtained. In accordance with this invention, it is preferred to heat the gas in the central chamber 20 to a temperature ranging from 600–1200° C. whereby the gaseous reducing agent is heated to this temperature prior to entering the reaction zone. The electrical resistance elements 32, due to their position in central chamber 20 just inside and along the surface of tubular member 7, simultaneously heat the gaseous reducing agent passing through tubing 34 and the reaction chamber 11 to maintain the reaction chamber at a temperature ranging from 600–1200° C. Thus, maximum heating efficiency is obtained by positioning the electrical resistance heating elements in central chamber 20 since heat is radiated in all directions. In the prior art practice wherein heating is accomplished by external furnacing means, a substantial amount of the heat radiated in a direction away from the reaction zone is wasted. Even where a heat reflecting sheet is employed as an outer shell, substantial heat is lost due to the inefficiency of even the best reflecting materials.

A narrow space or chamber 38 defined by plate 13, plate 25 and larger tubular member 9 provides a means for conducting the gaseous reducing agent from the tubing 34 and central chamber 20 to the outer or reaction chamber 11, the open end of the tubing 34 passing through lower metal plate 13 and opening into chamber 38. The gas in chamber 38 is permitted to pass upwardly into the reaction chamber 11 by passing through the perforations 17 in plate 13.

A plurality of conduits 43 are provided for conducting the metal compound to be reduced, generally a halide, and more specifically a chloride of a refractory metal selected from the group consisting of niobium, tantalum, molybdenum and tungsten into the annular chamber 11. Cap members 45 are provided over the open ends of conduits 43 and affixed to the inside of tubular member 9 by lugs 47, leaving small spaces 49 for the gas to escape into the chamber 11. Cap members 45 serve as deflectors or distributors to more evenly distribute the metal compound gas into the reaction chamber and, in addition, prevent particles of the pure metal present in the chamber 11 from entering conduits 43. In order to introduce the metal compound into the reaction chamber 11 as a gas where the compound is not normally in a gaseous state, flash vaporizers 51 are provided to vaporize a liquid compound such as liquid niobium pentachloride for introduction into the reaction chamber. The vaporizers 51 may comprise an annular chamber 53 defined by a circular plate 55, small plates 57 and outer shell 29. A suitable inlet 59 is provide to introduce the liquid compound into chamber 53. Chamber 53 is heated by suitable heating means such as electric resistance elements diagrammatically illustrated at 61. Insulation 62 is provided around chamber 53 and heating elements 61, and a shell 63 of material which which may be the same as shell 29 is provided around insulation 62.

Dry pipes 68 which comprise tubular members having openings 70 in the upper portion thereof are provided in the upper portion of reaction chamber 11 for conducting gaseous material, produced by reacting the gaseous reducing agent with the metal compound, out of the chamber 11 and into the heat exchanger, i.e. chamber 22, where it passes in heat exchange relationship with the gaseous reducing agent passing through portion 35 of spiral metal tubing 34, thereby heating the gaseous reducing agent and cooling the gaseous material. The gaseous material then passes through openings 24 in partition 21 into chamber 26 where the gaseous products of reaction are cooled further by passing in heat interchange relationship with a cold cooling fluid such as water, passing through spiral tubing 72. An outlet 74 is provided in the upper end of space 26 primarily to permit the gaseous waste products to leave the apparatus.

A body of the desired elemental metal in particulate form is provided in outer chamber 11 and supplied thereto and removed therefrom through an opening 66 in the side thereof and a conduit (not shown). Where the opening 66 is small, as shown in the drawing, the metal particles may be blown into the chamber with a gas such as argon. The particles may be removed through opening 66 by applying gas pressure through conduit 74 when the particles have reached the desired size. Suitable valves (not shown) or other closing means are provided for all inlets or outlets for outer chamber 11.

A vibrator is provided to vibrate the reaction chamber producing an agitated bed of the metal particles, providing spacing between the particles, thereby preventing sintering of the particles and facilitating passage of the gaseous reducing agent through the particles and contact of the gas with all surfaces of all particles for better reaction efficiency and deposition of the metal on the particles.

In a preferred embodiment of this invention, the vibrator comprises a rotatable member such as a shaft 76 of an engine or an electric motor 78. Eccentric weights 80 are affixed to the ends of the shaft 76 whereby rotation of the shaft vibrates the motor. The motor 78 is affixed to the reactor by means of bars 82 of a suitable material such as steel which are rigidly affixed to the motor 78 and the reactor 3. As shown in the drawing, the bars 82 are affixed at one end to the motor and at the other end to outer shell 29 of reactor 3. Thus, since the reactor 3 and the motor attached thereto are flexibly supported by springs 5, rotation of the motor shaft with eccentric weights 80 results in vibrating the motor shaft, thereby vibrating the motor 78 and reactor 3 and the body of particles of the desired metal is vibrated or agitated.

The method embodying the principles of this invention and the operation of the apparatus described above and shown in the drawing is as follows.

A body of the desired metal in particulate form is charged with a stream of argon gas into the reaction zone or chamber 11. The body of metal particles is agitated by vibrating the reactor 3 during the reduction operation through rotation of the shaft 76 of motor 78 in the manner described above. The gaseous reducing agent enters the upper end of spiral metal tubing 34 and is heated as it passes through portion 35 by passage through chamber 22 in heat exchange relationship with gaseous material. The gaseous reducing agent is then heated further by passage through spiral tubing 34 in central chamber 20 which forms a heating zone and thus is passed in association with a source of heat, namely electric resistance elements 32, and heated to a temperature ranging from 600–1200° C. The heated gaseous reducing agent then passes through chamber 38 and upwardly through perforations 17 into chamber 11. The metal compound is introduced into the chamber through conduits 43 and thus the gaseous reducing agent is passed into contact with a compound of the metal in reaction chamber or zone 11 which is maintained at a temperature of from 600–1200° C. by the same source of heat, namely the electric resistance elements 32, as was employed for preheating the gaseous reducing agent. The gaseous reducing agent reacts with the metal compound in the presence of the body of the metal in particulate form in chamber 11 to effect reduction of the compound, thereby producing the pure metal and gaseous products or material.

In general, it is necessary to employ an amount of gaseous reducing agent in excess of the theoretical amount required in order to completely reduce the metal compound. Thus, where the metal compound is a halide it is necessary to employ an amount of reducing agent in excess of the stoichiometric equivalent of the halide content of the metal halide in order to completely reduce the halide to the pure metal. While the desired results may be obtained with a large excess, only a relatively small excess is required and any greater amounts would serve no useful purpose and thus are undesirable from the economic point of view. Where the compound is the chloride, the gaseous reducing agent is hydrogen and the metal is niobium, tantalum or molybdenum, the following reduction reaction generally takes place in the reaction zone or chamber 11: $2MCl_5 + 5H_2 \rightarrow 10HCl + 2M$, the letter M representing the metal niobium, tantalum or molybdenum. In this instance, it is preferred to employ an amount of hydrogen ranging from about two to twenty times the theoretical amount required by the above equation although higher or lower amounts may be employed if desired. Where the metal is tungsten, generally the following reaction takes place in the reaction zone: $WCl_6 + 3H_2 \rightarrow 6HCl + W$. In the above instances, where the metal is tungsten, hydrogen in an amount ranging from about one to four times the theoretical amount required by the above equation is preferred although greater amounts may be employed if desired. The desired metal in solid form and gaseous material comprising HCl and excess hydrogen is produced by these reduction reactions. The metal formed in the reduction is deposited upon the surfaces of the metal particles. The gaseous material passes through dry pipes 68 into chamber 22 where it is cooled by heat exchange with the gaseous reducing agent passing to the central chamber 20 and passes through openings 24 into chamber 26 where it is further cooled by heat exchange with a suitable additional cooling medium, such as water, passing through spiral tubing 72. The gaseous material leaves the apparatus through outlet 74. When the desired amount of metal has been deposited on the metal particles, the particles are removed through opening 66 by closing the inlets for the reducing agent and metal compound with suitable valves (not shown) and applying pressure to chamber 11 by means of argon gas entering through conduit 74.

The following are examples illustrating the practice of this invention.

*Example I*

5500 grams of 99.99% pure niobium powder having a particle size in the fraction which passes through a 60 mesh screen and is retained on a 200 mesh screen are charged through the side opening to the annular space or reaction chamber of an "Inconel" reactor of the type shown in the drawing by means of a stream of argon gas. The inner tubular member is 4.50" outside diameter, 0.24" wall thickness and 20" long while the outer tubular member is 6.07" inside diameter, 0.28" thick and 14" long. Chamber 26 is 4" long, chamber 22 is 4" long, chamber 20 11.5" long and chamber 38 is 3/4" long. The charge of niobium is agitated and vibrated by rotating the motor shaft at 200 r.p.m. The motor is a 1/15 horsepower, 115 volts, alternating current electric motor having a one-pound eccentric weight affixed to the top end of the motor shaft and a 1/2-pound eccentric weight affixed to the bottom end and spaced 6" apart with their centers of gravity 5/8" from the centerline of the shaft and diametrically opposed. The motor is mounted with the centerline of the motor shaft coinciding with the centerline of the reactor and the uppermost weight 1" from the bottom of the reactor.

Hydrogen gas is passed through the spiral tubing and heated by heat interchange with the gaseous material from room temperature to a temperature of 200° C. and then heated by the electrical resistance elements on the inside of the smaller tubular member to a temperature of 800° C. The gas is passed through the spiral tubing and enters the reaction chamber at a rate of 0.9 standard cubic foot per minute. The reaction zone is maintained by the electrical resistance elements at a temperature of 800° C.

Liquid niobium pentachloride is fed to the flash vaporizers at a rate sufficient to feed niobium pentachloride vapor to the reaction zone at 9.4 grams per minute, the niobium pentachloride being vaporized at 275° C. by the resistance elements. With the niobium pentachloride being fed at 9.4 grams per minute and the hydrogen being fed at 0.9 standard cubic foot per minute, twelve times the stoichiometric amount of hydrogen is reacted with the niobium pentachloride. Reduction occurs within the agitated bed of niobium particles with the pure niobium product depositing on the particles. The gaseous material which comprises hydrogen chloride, excess hydrogen and partially reacted niobium pentachloride leaves through the dry pipe and the two heat exchange zones at a rate of about 0.97 standard cubic foot per minute and is cooled therein to substantially room temperature. The above procedure is carried out for a period of about 270 minutes. The metal particles are then removed through the side opening by means of the pressure of argon gas applied through the gaseous material outlet. The increase in the weight of the niobium bed at the termination of this run is 792 grams which indicates 91% recovery of the niobium as metal from the niobium pentachloride fed to the reactor.

*Example II*

6500 grams of 99.99% pure tungsten powder having a particle size in the fraction which passes through a 60 mesh screen and is on a 100 mesh screen are charged to the annular space or reaction chamber of a reactor and agitated. The reactor and agitation means are the same as in Example I.

Hydrogen gas is passed through the spiral tubing and heated by heat interchange with gaseous waste products from room temperature to a temperature of 175° C. and then heated by the electrical resistance elements on the inside of the smaller tubular member to a temperature of 750° C. The gas is passed through the spiral tubing and enters the reaction chamber at a rate of 0.11 standard cubic foot per minute. The reaction zone is maintained by the electrical resistance elements at a temperature of 750° C.

Liquid tungsten hexachloride is fed to the flash vaporizers at a rate sufficient to feed tungsten hexachloride vapor to the reaction zone at 8.47 grams per minute, the tungsten hexachloride being vaporized at 370° C. by the resistance elements. With the tungsten hexachloride being fed at 8.47 grams per minute and the hydrogen being fed at 0.11 standard cubic foot per minute, twice the stoichiometric amount of hydrogen is reacted with the tungsten hexachloride. Reduction occurs within the agitated bed of tungsten particles with the pure tungsten product depositing on the particles. The gaseous material which comprises hydrogen chloride, partially reacted tungsten hexachloride and excess hydrogen leaves through the dry pipe and the two heat exchange zones at a rate of about 0.17 standard cubic foot per minute and is cooled therein to substantially room temperature. The above procedure is carried out for a period of about 300 minutes. The increase in the weight of the tungsten bed at the termination of this run is 1009 grams, which indicates 93% recovery of the tungsten as metal from the tungsten hexachloride fed to the reactor.

*Example III*

5500 grams of 99.99% pure tantalum powder having a particle size in the fraction which passes through a 60 mesh screen and is retained on a 200 mesh screen are charged to the annular space or reaction chamber of a reactor and agitated. The reactor and agitation means are the same as in Example I.

Hydrogen gas is passed through the spiral tubing and heated by heat interchange with the gaseous material from room temperature to a temperature of 225° C. and then heated by the electrical resistance elements of the inside of the smaller tubular member to a temperature of 850° C. The gas is passed through the spiral tubing and enters the reaction chamber at a rate of 0.57 standard cubic foot per minute. The reaction zone is maintained at a temperature of 850° C.

Liquid tantalum pentachloride is fed to the flash vaporizers at a rate sufficient to feed tantalum pentachloride vapor to the reaction zone at 5.45 grams per minute, the tantalum pentachloride being vaporized at 260° C. by the resistance elements. With the tantalum pentachloride being fed at 5.45 grams per minute and the hydrogen being fed at 0.57 standard cubic foot per minute, 17.5 times the stoichiometric amount of hydrogen is reacted with the tantalum pentachloride. Reduction occurs within the agitated bed of tantalum particles with the pure tantalum product depositing on the particles. The gaseous material which comprises hydrogen chloride, partially reacted tantalum pentachloride and excess hydrogen leaves through the dry pipe and the two heat exchange zones at a rate of about 0.60 standard cubic foot per minute and is cooled therein to substantially room temperature. The above procedure is carried out for a period of about 350 minutes. The increase in the weight of the tantalum bed at the termination of this run is 835 grams which indicates 87% recovery of the tantalum as metal from the tantalum pentachloride fed to the reactor.

It is to be understood that various changes and modifications may be made in the foregoing apparatus and method of operation without departing from the spirit of the invention and scope of the appended claims.

What is claimed is:

1. An apparatus for reducing a metal compound with a gaseous reducing agent to produce a metal comprising a reactor, resilient means for supporting said reactor, partitioning means provided in said reactor to define at least two chambers, heating means, means for conducting said gaseous reducing agent through one chamber in a manner to permit heating said gaseous reducing agent by said heating means, means for conducting heated gaseous reducing agent into at least one other chamber, means for conducting said metal compound into said other chamber, means for introducing a body of said metal in particulate form into said other chamber and removing said metal in particulate form from said other chamber and vibrator means for vibrating said reactor.

2. An apparatus for reducing a metal compound with a gaseous reducing agent to produce a metal comprising a reactor, resilient means for supporting said reactor, partitioning means provided in said reactor to define a central chamber and an outer chamber surrounding said central chamber, heating means provided within said central chamber, means for conducting said gaseous reducing agent through said central chamber in a manner to permit heating said gaseous reducing agent by said heating means, means for conducting heated gaseous reducing agent from said central chamber into said outer chamber, means for conducting said metal compound into said outer chamber, means for introducing a body of said metal in particulate form into said outer chamber and to remove said metal in particulate form from said outer chamber and vibrator means for vibrating said reactor.

3. The apparatus of claim 2 including means for vaporizing said metal compound and for conducting it into said outer chamber.

4. An apparatus for reducing a metal compound with a gaseous reducing agent to produce a metal comprising a heat exchange means, a reactor, resilient means for supporting said reactor, partitioning means provided in said reactor to define a central chamber and an outer chamber surrounding said central chamber, heating means provided within said central chamber, means for conducting said gaseous reducing agent through said heat exchange means and then through said central chamber in a manner to permit heating said gaseous reducing agent by said heating means, means for conducting heated gaseous reducing agent from said central chamber into said outer chamber, means for vaporizing said metal compound and for conducting it into said outer chamber, means for introducing a body of said metal in particulate form into said outer chamber and for removing said metal in particulate form from said outer chamber, means for conducting gaseous material produced by reacting said gaseous reducing agent with said metal compound in said outer chamber through said heat exchange means in heat interchange relationship with said gaseous reducing agent and vibrator means for vibrating said reactor.

5. The apparatus of claim 4 including means for further cooling of said gaseous waste material which has been cooled by heat exchange with said gaseous reducing agent.

6. The apparatus of claim 5 wherein said vibrator means comprises a motor provided with shaft weights and affixed to said reactor whereby rotation of said shaft vibrates said motor and said reactor.

References Cited by the Examiner

UNITED STATES PATENTS

| | | | |
|---|---|---|---|
| 2,556,763 | 6/1951 | Maddex | 266—24 |
| 2,637,625 | 5/1953 | Garbo | 23—288.35 |
| 2,784,960 | 3/1957 | Lee | 266—24 |
| 3,012,876 | 12/1961 | Eaton et al. | 75—26 |
| 3,020,148 | 2/1962 | Jenkins et al. | 75—26 |
| 3,078,082 | 2/1963 | Hnilicka | 266—24 |
| 3,197,328 | 7/1965 | Jung et al. | 75—26 |
| 3,216,822 | 11/1965 | Brothers et al. | 75—26 |

FOREIGN PATENTS 133,324   8/1951   Sweden.

JOHN F. CAMPBELL, Primary Examiner.

WINSTON A. DOUGLAS, Examiner.

L. J. WESTFALL, Assistant Examiner.